United States Patent
Dasgupta et al.

(10) Patent No.: US 12,141,880 B2
(45) Date of Patent: *Nov. 12, 2024

(54) SYSTEMS AND METHODS FOR COMBINE ROUTING

(71) Applicant: Monsanto Technology LLC, Saint Louis, MO (US)

(72) Inventors: Sambarta Dasgupta, Sunnyvale, CA (US); Anand Pramod Deshmukh, Albany, CA (US); Jesse B. Grote, Boone, IA (US); Hongwei Luo, Saint Louis, MO (US); Aviral Shukla, Defiance, MO (US); Zi Wang, Chesterfield, MO (US); Yiduo Zhan, Chesterfield, MO (US); Hui Zhang, Ballwin, MO (US); Xiaobo Zhou, Chesterfield, MO (US)

(73) Assignee: MONSANTO TECHNOLOGY LLC, Saint Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,811

(22) Filed: Jul. 28, 2023

(65) Prior Publication Data
US 2024/0013322 A1    Jan. 11, 2024

Related U.S. Application Data

(63) Continuation of application No. 16/906,289, filed on Jun. 19, 2020, now Pat. No. 11,715,166.

(60) Provisional application No. 62/864,107, filed on Jun. 20, 2019.

(51) Int. Cl.
G06Q 10/00    (2023.01)
A01D 41/00    (2006.01)
A01D 41/127   (2006.01)
G06Q 10/0631  (2023.01)
G06Q 50/00    (2024.01)
G06Q 50/02    (2012.01)

(52) U.S. Cl.
CPC .......... *G06Q 50/02* (2013.01); *A01D 41/127* (2013.01); *G06Q 10/06314* (2013.01)

(58) Field of Classification Search
CPC ......... G06Q 10/00; G06Q 30/00; G06Q 50/00
USPC ....................................................... 705/7.24
See application file for complete search history.

(56) References Cited

U.S. PATENT DOCUMENTS

| | | |
|---|---|---|
| 7,158,876 B2 | 1/2007 | Crook |
| 7,693,653 B2 | 4/2010 | Hussain et al. |
| 7,756,631 B2 | 7/2010 | Chavira et al. |

(Continued)

*Primary Examiner* — Mustafa Iqbal
(74) *Attorney, Agent, or Firm* — Harness, Dickey & Pierce, P.L.C.

(57) ABSTRACT

A routing processor implements a multi-stage prescriptive routing model engine based on harvest input data relating to the harvesting of crops at a plurality of locations by a plurality of combines and based on a harvest characteristic representing an attribute of the crops to be harvested by the combines. The multi-stage prescriptive routing model engine generates a combine routing program prescribing the movement of each combine between the locations and includes a demand stage configured to identify combine harvesting demand as a function of the harvest input data and the harvest characteristic and a scheduling stage configured to generate the combine routing program as a function of the harvesting demand.

19 Claims, 4 Drawing Sheets

(56) References Cited

U.S. PATENT DOCUMENTS

| | | |
|---|---|---|
| 9,076,118 B1 | 7/2015 | Mewes et al. |
| 11,715,166 B2 | 8/2023 | Dasgupta et al. |
| 2002/0177945 A1 | 11/2002 | Davies |
| 2003/0182144 A1 | 9/2003 | Pickett et al. |
| 2007/0089390 A1 | 4/2007 | Hendrickson et al. |
| 2011/0270724 A1 | 11/2011 | O'Neil |
| 2011/0307141 A1 | 12/2011 | Westerlage |
| 2013/0166344 A1 | 6/2013 | Grothaus |
| 2015/0106434 A1 | 4/2015 | Fiene |
| 2016/0026940 A1 | 1/2016 | Johnson |
| 2017/0055455 A1 | 3/2017 | Missotten et al. |
| 2017/0083840 A1 | 3/2017 | Lynar |
| 2017/0280614 A1 | 10/2017 | Turpin |
| 2018/0232674 A1 | 8/2018 | Bilde |
| 2023/0107444 A1* | 4/2023 | Anderson ............ A01B 79/005 382/110 |

\* cited by examiner

SYSTEMS AND METHODS FOR COMBINE ROUTING

CROSS-REFERENCE TO RELATED APPLICATIONS

This application is a continuation of U.S. patent application Ser. No. 16/906,289, filed on Jun. 19, 2020, which claims the benefit of and priority to U.S. Provisional Application No. 62/864,107, filed on Jun. 20, 2019. The entire disclosure of each of the above applications is incorporated herein by reference.

TECHNICAL FIELD

Aspects of the present disclosure generally relate to systems and methods for combine routing. More particularly, aspects of the present disclosure relate to systems and methods for developing a combine routing program based on a crop characteristic of the crops to be harvested by the combines.

BACKGROUND

Large agricultural operations include many fields or plots spread out over a large area and containing crops maturing at different times that need to be harvested. These large agricultural operations may group their fields into regions. A large agricultural operation may have hundreds of regions, with each region containing hundreds or thousands of fields. Generally speaking, a region may be the size of a county, several adjacent counties, a state or several adjacent states depending upon how the agricultural operation determines its regions. Each region includes several locations (broadly, individual farms) including one or more fields.

Combines are used to harvest the crops (e.g., corn, grain, etc.) growing in the fields. A large agricultural operation will have a plurality of combines to harvest the fields within the regions. It is not economically feasible for an agricultural operation to have enough combines to harvest all the fields at each location within a region or between regions at the same time. Accordingly, the combines are frequently moved between regions and between locations in each region to harvest the fields at each location. As a result, the fields at the different locations are frequently harvested at different times (e.g., on different days). These fields often have to be harvested before strict business deadlines. As a result, there is generally intense competition for the limited number of combines. Determining the movement of combines between these locations in order to harvest the fields before the strict business deadline is extremely complex. For example, a large agricultural operation that has 75 combines and 500 regions, has on the order of $500^{75} = 3 \times 10^{204}$ possible number of moves for the combines. Moreover, often times these fields need to be harvested at a specific time in order to for the harvested crops to have a particular attribute or characteristic. Due to the already existing complexity of determining the movement of combines to meet the strict business deadlines, however, the specific time for harvesting the crops is typically ignored and given little to no consideration in conventional methods for determining combine movement. In addition, frequent changes to weather (combines generally do not harvest while it is raining), combine breakdowns, and other interruptions only further complicate the problem of determining the movement of the combines.

SUMMARY

In an aspect, a system comprises a routing processor and one or more computer-readable storage media. The storage media stores harvest input data relating to the harvesting of crops at a plurality of locations by a plurality of combines, at least one harvest characteristic representing an attribute of the crops to be harvested by the combines, and computer-executable instructions. Each location has one or more fields containing crops for harvest by at least one of the combines. The computer-executable instructions, when executed by the routing processor, configure the routing processor to implement a multi-stage prescriptive routing model engine based on the harvest input data and the harvest characteristic to generate a combine routing program prescribing the movement of each combine between the plurality of locations. The multi-stage prescriptive routing model engine includes a demand stage configured to identify combine harvesting demand as a function of the harvest input data and the harvest characteristic and a scheduling stage configured to generate the combine routing program as a function of the harvesting demand.

In another aspect, a computer-implemented method comprises storing, in one or more computer-readable storage media, harvest input data relating to the harvesting of crops at a plurality of locations by a plurality of combines and at least one harvest characteristic representing an attribute of the crops to be harvested by the combines. Each location has one or more fields containing crops for harvest by at least one of the combines. The method also comprises executing, by a routing processor, a multi-stage prescriptive routing model engine based on the harvest input data and the harvest characteristic to generate a combine routing program prescribing the movement of each combine between the locations. The multi-stage prescriptive routing model engine includes a demand stage to generate a combine harvesting demand as a function of the harvest input data and the harvest characteristic. The multi-stage prescriptive routing model engine also includes a scheduling stage to generate the combine routing program as a function of the combine harvesting demand.

In another aspect, a system comprises a plurality of combines for use in an agricultural operation and a routing processor. The system also comprises one or more computer-readable storage media storing harvest input data relating to the harvesting of crops within the agricultural operation at a plurality of locations by the combines, at least one harvest characteristic representing an attribute of the crops to be harvested by the combines, and the computer-executable instructions. Each location includes one or more fields containing crops for harvest by at least one of the combines. The computer-executable instructions, when executed by the routing processor, configure the routing processor to implement a multi-stage prescriptive routing model engine based on the harvest input data and the harvest characteristic to generate a combine routing program prescribing the movement of each combine within the agricultural operation. The multi-stage prescriptive routing model engine includes a demand stage configured to identify combine harvesting demand as a function of the harvest input data and the at least one harvest characteristic and a scheduling stage configured to generate the combine routing program as a function of the harvesting demand. The harvest input data includes harvest progress data representing at least one attribute of any harvesting completed by the combines. Each combine is configured to provide at least a portion of the harvest progress data in real time and the multi-stage prescriptive routing model engine is configured to update the combine routing program in real time in response to at least a portion of the harvest progress data being updated in real time.

In yet another aspect, a method of moving a plurality of combines between a plurality of locations in a breeding operation includes predicting an interval for each of a plurality of locations when a crop at each location will have a moisture content within a predetermined range. The method also includes determining combine harvesting demand based on the predicted intervals for each of the plurality of locations. The combine harvesting demand includes a number of combines needed at each location in order to harvest the crops with the moisture content within the predetermined range within the predicted interval. The method further includes generating a combine routing program prescribing the movement of each combine between the locations as a function of the combine harvesting demand and moving one or more of the combines according to the combine routing program to one of the locations.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
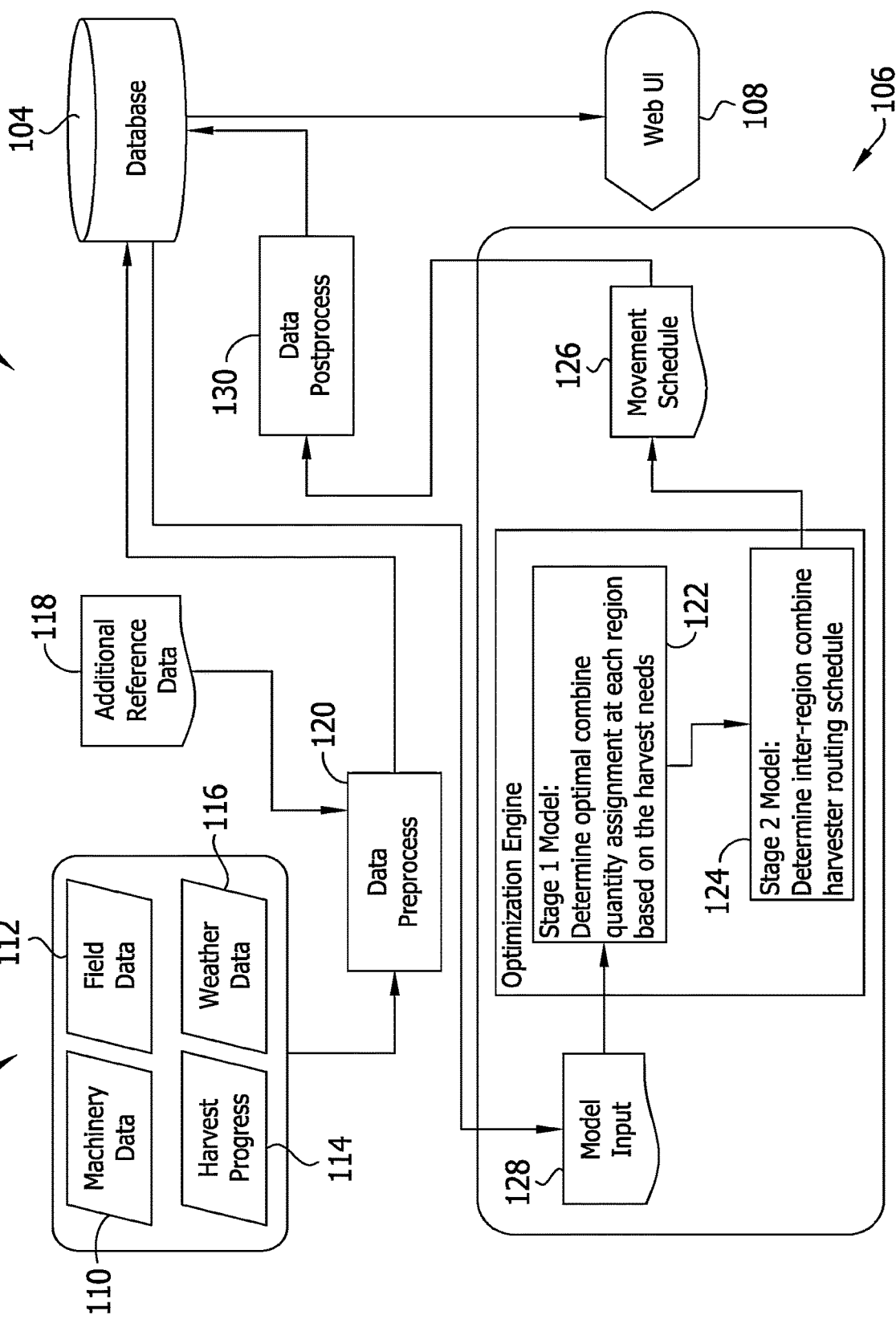
FIG. 1 is a schematic of a combine routing system according to one embodiment of the present disclosure.

FIG. 1 illustrates one embodiment of an exemplary combine routing system (broadly, routing system or system), generally indicated at 100, according to the present disclosure. The system 100 may be used in agricultural operations for generating a combine routing program 126 (e.g., schedule, scheme, plan, solution) that prescribes the movement of each combine 103 (FIG. 2) of a plurality of combines of the agricultural operation between a plurality of locations containing one or more fields containing crops to be harvested by the combines. In particular, the system 100 prescribes the movement of each combine 103 of a plurality of combines based on one or more parameters, such as a crop characteristic of the crops. For example, as described in more detail below, the crop characteristic can be a harvest characteristic. It is understood that the routing system 100 described herein may be used to route other devices besides combines, such as other types of vehicles, equipment, machines, tools, airplanes, unmanned aerial vehicles "UAVs" (e.g., drones), etc.

Figure 2:
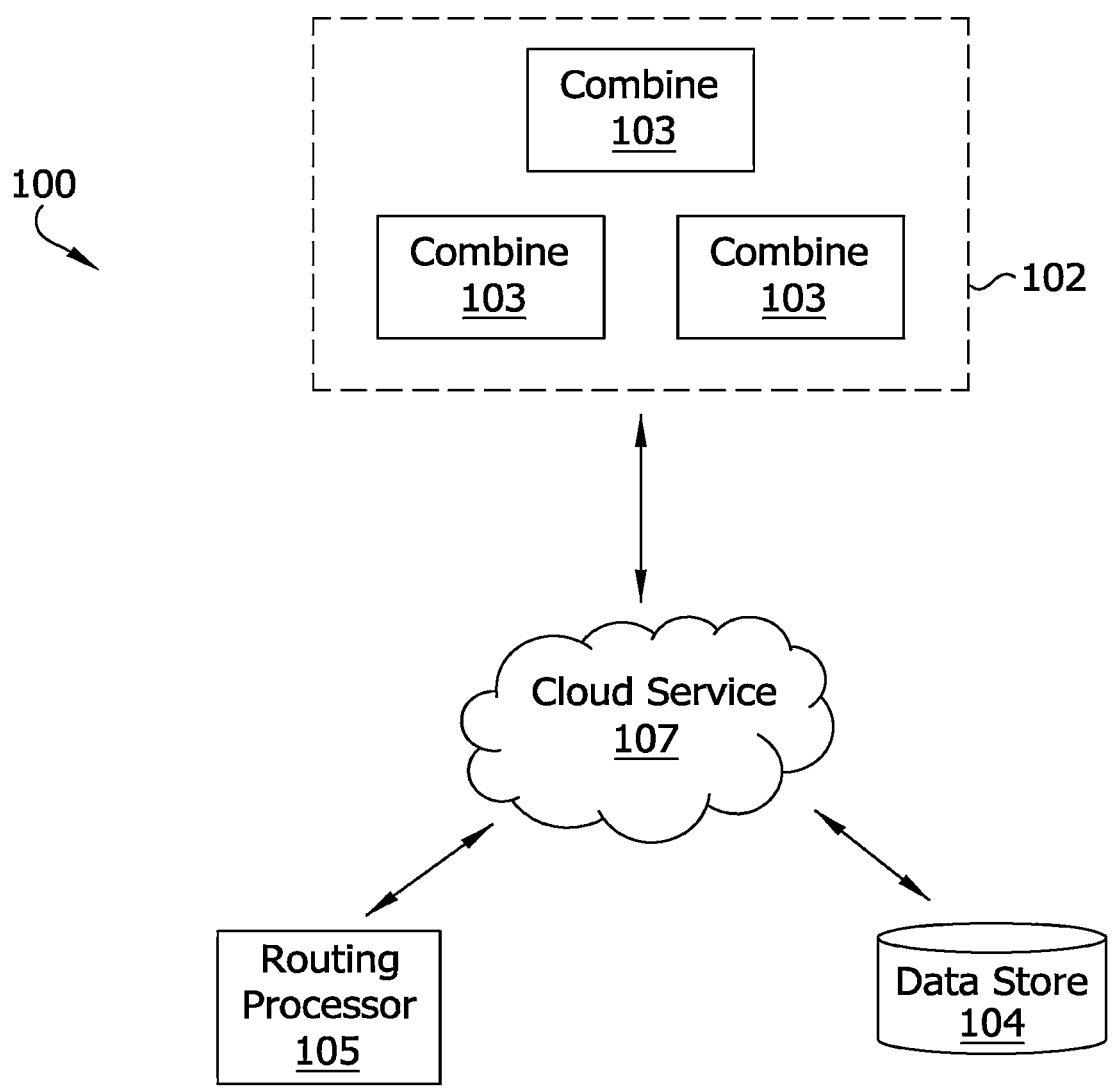
FIG. 2 is an illustration of a combine routing system according to one embodiment of the present disclosure.

The system 100 includes one or more data sources 102, one or more data stores 104 (broadly, one or more computer-readable storage media), a multi-stage prescriptive routing model engine 106, and at least one user interface 108. Aspects of the system 100 are communicatively coupled together. This may be done by wired or wireless communications systems and devices, as generally understood in the art. In accordance with an aspect of the disclosure, the multi-stage prescriptive routing model engine 106 is embodied on a computer-readable memory storage device, such as the one or more data stores 104, and is executed by a processor, such as the routing processor 105 (FIG. 2).

The one or more data sources 102 are adapted to provide input data (e.g., crop input data, harvest input data, etc.) to be used by the multi-stage prescriptive routing model engine 106 in order to generate the combine routing program 126. Each data source 102 provides at least a portion of the input data and the input data is stored in the one or more data stores 104. The data sources 102 may be wired or wirelessly connected to the one or more data stores 104. The data sources 102 may be a computer, a server, a controller, a software program, a predictive model, a database, and the like. Generally, a data source 102 may be anything containing a parameter that is used by the multi-stage prescriptive routing model engine 106. In the illustrated embodiment, there are five data sources 102: a combine inventory data source 110, a location data source 112, a harvest progress data source 114, a weather data source 116, and a reference data source 118. The system 100 may include more or less data sources and/or other types of data sources. Moreover, one or more of these data sources may be combined into a single data source. The input data is, broadly, a collection of parameters (e.g., information) to be used by the multi-stage prescriptive routing model engine 106 in the formulation of the combine routing program 126.

Each of the combine inventory data source 110, the location data source 112, the harvest progress data source 114, the weather data source 116 and the reference data source 118 provides at least a portion of the input data. The input data may also come from other data sources or fewer than these five sources. Each of the combine inventory data source 110, the location data source 112, the harvest progress data source 114, the weather data source 116 and the reference data source 118 provide a portion of the input data. The combine inventory data source 110 provides combine inventory data representing information about the combines 103. The combine inventory data can represent, for example, the total number of combines of the plurality of combines. In particular, the combine inventory data may include information about one or more of the total number of combines, the type of each combine, the name of each combine, the operational status of each combine (whether the combine is operational or non-operational (e.g., broken down and in need of repair to become functional)), the harvesting capacity or rate of each combine (e.g., the fields per day the combine can harvest), the availability of each combine (e.g., the date the combine becomes operational from non-operational status), and/or the compliance type of each combine (e.g., combine capabilities—fields with a specific compliance type can only be harvest by a specific type(s) of combines).

The location data source 112 provides location data representing at least one attribute of each location. For example, the location data may include information about one or more of the identifier for each location, the moisture dry down date (e.g., the date the crops at that location are predicted to reach a minimum moisture level for viability or the last date the crops are expected to have the harvest characteristic), the harvest ready date for each location (e.g., the earliest date the crops at each location are going to have the harvest characteristic, such as a specific moisture level, and be ready for harvesting), the harvest completion date for each location (e.g., the date by when the crops at each location must be harvested), the number of fields at each location, the name of the station (e.g., hub) associated with each location, the field compliance type for each location and/or field (e.g., classification of fields based on regulatory status and is matched with compliance type of each combine in order to match the compliance types of the locations and combines), the maximum number of combines allowed at each location, and/or the field quality rating for each location and/or field (e.g., a prioritization rating for the locations and/or fields).

The harvest progress data source 114 provides harvest progress data representing at least one attribute of any harvesting completed by the plurality of combines. For example, the harvest progress data may include information about one or more of the completion status for each location (e.g., whether or not the harvesting is completed at each location and/or the percent completion of each location and/or field), the name of each combine in order to cross-reference the harvest progress data with the combine inventor data, the current location of each combine, and/or the number of plots completed for each field. The current location of the combine may be the identifier of the location or the name of the station the combine is currently at.

The weather data source 116 provides weather data representing at least one of the current and expected weather conditions at each location. For example, the weather data may include information about one or more of the name of the city each location is in and/or the dates each city, and therefore location, are expected to experience a rain event. The weather data may also include the identifier for each location so that the weather data may be linked with the location data. The other types of data may also have the same pieces of information in order to subsequently link (e.g., cross-reference) the types of data.

The reference data source 118 provides reference data relating to other (broadly, at least one other) attributes of the harvesting of the crops. For example, the reference data may include information about one or more of the travel distance between the different positions (e.g., an origin position and a destination position) and/or the expected travel time between the origin and destination positions. The reference data may also include information about one or more of the name of each station, the name of the country each station is located in, the geographic position of each station (e.g., longitude and latitude), the maximum number of combines that can be stored or held at the station, and/or the number of work days within one week. In this embodiment, each region may have one or more stations used to store one or more of the combines 103 when the combines are not at a location. For example, the stations may be used to store the combines 103 when they are not harvesting or when the combines are being repaired.

The input data includes at least one of the combine inventory data, the location data, the harvest progress data, the weather data and the reference data. In the preferred embodiment, the input data includes the combine inventory data, the location data, the harvest progress data, the weather data and the reference data. It is understood that the information supplied by each data source 102 is not limited to the information listed above. Moreover, it is understood that the information listed above may be supplied by any of the data sources 102 and included in any of the types (e.g., the combine inventory data, the location data, the harvest progress data, the weather data and the reference data) of input data. The information listed above for the input data (and each type thereof) is not exhaustive and it is understood the other types of information may be included in the input data (and/or each type thereof).

Each data source 102 may be configured to provide the portion of the input data to the one or more data stores 104 or the portion of the input data from each data source may be automatically pulled from and stored in the one or more data stores. In the illustrated embodiment, the system 100 includes a pre-processing operation 120 for normalizing the different types of input data (e.g., the combine inventor data, the location data, the harvest progress data, the weather data and the reference data) before the input data is stored in the one or more data stores 104. The pre-processing operation 120 receives the data provided by each data source 102 and converts the data into a standard format, which is then stored in the one or more data stores 104. For example, because the input data may come from a variety of sources 102, each source may provide their respective data in a unique format (e.g., a format different than at least one other data source). The pre-processing operation 120 coverts the input data from the different sources into a standard format (e.g., single format) so that the input data can be used by the multi-stage prescriptive routing model engine 106. In one embodiment, the pre-processing operation 120 is embodied on a computer-readable memory storage device, such as the one or more data stores 104, and is executed by a processor, such as the routing processor 105.

In one embodiment, a portion or all of the input data is updated in real time. For example, in one embodiment the system 100 includes the plurality of combines 103 (FIG. 2). Each combine 103 acts as a data source 102 and provides a portion of the harvest input date in real time. The combines 103, specifically the onboard computers of each combine, are in communication (e.g., wired or wireless) with the other aspects of the system 100 to provide a portion of the input data. In the embodiment illustrated in FIG. 2, the combines 103 and the other components of the system 100, such as the routing processor 105 and the one or more data stores 104, are communicatively coupled together via a cloud based service 107. Other methods of communicatively coupling the components of the system 100 are within the scope of the present disclosure. The combines 103 may provide at least a portion of the harvest progress data such as one or more of the following: the completion status for the location the combine is at, the name of the combine, and the current location of the combine. The combines 103 may also provide other portions of the input data. The combines 103 can update their provided portions of the input data in real time in order to keep the system 100 and the combine routing program 126 generated by the multi-stage prescriptive routing model 106 updated in real time—reflecting the actual conditions of the combines and the harvesting. It is appreciated at other portions, if not all, of the input data can be updated in real time from each of the data sources 102. For example, the weather data can be updated in real time to account for changes in current weather conditions and predicted (e.g., future) weather conditions.

The system 100 also includes at least one crop characteristic (e.g., at least one crop characteristic data). Each crop characteristic represents an attribute of the crops. One example of the crop characteristic is a harvest characteristic representing an attribute of the crops to be harvested by the plurality of combines 103. The harvest characteristic attribute may be a desired characteristic of the crops at harvesting (e.g., the crops want to be harvested with this attribute) or the attribute may not be a desired characteristic of the crops (e.g., the crops do not want to be harvested with this attribute). The at least one crop characteristic may include information about one or more of the name/type of each crop characteristic, the attribute of each type of each crop characteristic, and/or the day or days (broadly, interval) the crops in each field or at each location are predicted (e.g., expected) to have the attribute of each type of each crop characteristic. While the harvest characteristic is the primary example used in this disclosure of the crop characteristic, it is understood that the use of other crop characteristics and other characteristics in general are within the scope of the present disclosure. Accordingly, the teachings set forth herein regarding the system 100 in relation to harvest characteristics applies equally to other crop characteristics and other characteristics in general.

In one embodiment, the one harvest characteristic is the moisture content of the crop at the time of harvest. In particular, the harvest characteristic is a desired moisture content the crops possess at the time of harvest. In this example, the harvest characteristic may include information about one or more of "moisture content" (the name of the harvest characteristic), "17%-30%" (the desired attribute or moisture content for the crops), and/or "April 15-April 25" (the expected days or interval the crops are predicted to have a moisture content of between 17%-30%). These values are exemplary only and it is understood the other values are within the scope of the present disclosure. For example, the moisture content attribute may be "25%" (or any other value) and the date may be "April 30" (or any other date or group of dates). Other harvest characteristics (broadly, crop characteristics) within the scope of the present disclosure include harvesting based on harvest needs (e.g., maximizing the amount of a particular type of crop) and harvesting based on the number of plots for each field (e.g., the amount of crops at each field). In one embodiment, the combines 103 are able to determine the moisture content percentage of the crops at the time they are harvested by the combine. In this embodiment, the combine may then send the actual moisture content percentage of the crops to the other components of the system 100 (e.g., data sources 102, data store 104, etc.) to be utilized by those components. In this manner, feedback regarding the actual attribute of the at least one harvest characteristic in the crops may be provided to the different components of the system 100. Such feedback can be used to compare actual attribute of the crop to the target attribute.

The at least one harvest characteristic is provided to the system 100 and stored in the one or more data stores 104 to be accessed by the multi-stage prescriptive routing model engine 106. As explained in more detail below, the multi-stage prescriptive routing model engine 106 utilizes the at least one harvest characteristic (and the input data) to generate a combine routing program 126 that maximizes an amount of crops harvested by the plurality of combines 103 at the plurality of locations that have the at least one harvest characteristic. In one embodiment, the at least one harvest characteristic is provided by one of the data sources 102. For example, the at least one harvest characteristic can be supplied by the weather data source 118. Accordingly, in certain embodiments, the at least one harvest characteristic may be considered a part of the input data. In one embodiment, the at least one crop characteristic is provided by a predictive model (which may also be a data source 102) which can generate the day or days (e.g., interval) the crops are expected to have the attribute. Such predictive models rely on current and expected future conditions to generate the day or days the crops are expected to have the attribute. For example, the moisture content of a crop depends on the type of the crop (e.g., corn, soy, etc.), climate/weather the crop is growing in and the geography the crop is growing in and the predictive models use information about these factors to determine when the crop should be harvested. In another embodiment, the at least one harvest characteristic may be manually entered into the system 100 by an operator. Due to the various ways the at least one harvest characteristic is supplied to the system 100, the at least one harvest characteristic may be normalized by the pre-processing operation 120, as described above. In one embodiment, the at least one harvest characteristic, or a portion thereof, is updated in real time. In particular, the specific day or days the crops in each field or at each location are predicted to have the attribute of each harvest characteristic may be updated in real time.

Additionally or alternatively to the at least one harvest characteristic, the multi-stage prescriptive routing model engine 106 may utilize other parameters (desired or undesired parameters) to generate a combine routing program that maximizes the parameter alone or in combination with the at least one harvest characteristic. Generally, the parameter does not relate to the harvest characteristic of the crops. For example, one parameter may be to reduce the cost of the fuel spent to transport the combines 103 between different locations. Accordingly, using the teachings set forth therein, the multi-stage prescriptive routing model engine may be configured to minimize the distances combines 103 are transported, such as the traveling distance between any two stations. Alternatively, the multi-stage prescriptive routing model engine may be configured to minimize fuel costs while also maximizing the amount of crops harvested having the harvest characteristic. Other parameters are within the scope of the present disclosure.

The one or more data stores 104 store the input data and the at least one harvest characteristic to be accessed by the multi-stage prescriptive routing model engine 106. In the illustrated embodiment, the system 100 includes a single data store 104 although more than one data store is within the scope of the present invention. The data store 104 is, broadly, a database storing the input data and the at least one harvest characteristic.

In one embodiment, the system 100 generally comprises a processor 105 and a memory. The memory includes non-transitory computer readable media for operating as a data store, such as data store 104, such that it can store component of the system including the input data, the pre-processing operation, the post-processing operation (described below), and the multi-stage prescriptive routing model engine 106. Thus, these components as described herein as existing in the system 100 are those at are stored in a data store of the system, which may be the same a data store 104 or a separate data store. The memory includes non-transitory computer readable media that stores computer executable instructions, in addition to those of the multi-stage prescriptive routing model engine 106, for operating the system 100 as described in this present disclosure. The memory may include volatile and/or non-volatile memory, and may comprise internal storage media and/or external storage media. Internal exemplary storage media includes RAM, ROM, EEPROM, flash memory and/or other internal storage media known in the art. Exemplary external storage media include memory sticks, CD-ROM, digital versatile disks (DVD), magnetic cassettes, magnetic tape, magnetic disks and/or other storage media known in the art.

The processor 105 is configured to communicate with the memory via a wired or wireless connection and to execute the instructions stored in the memory. It is appreciated that the processor 105 and memory may comprise a plurality of processors and a plurality of memories. For example, in one embodiment, the processor and the memory are a computer cluster, which comprises a plurality of loosely connected computing devices (e.g., processors and memories) that operate together such that they are viewed as a single system.

In general, the system 100 includes computer executable instructions that, when executed by the processor 105, configure the processor to implement the multi-stage prescriptive routing model engine 106 to generate a combine routing program 126 prescribing the movement of each combine 103 of the plurality of combines between the plurality of locations and/or stations. In other words, the combine routing program 126 assigns each combine 103 to a location and/or station for each day during the harvest or instructs (e.g., directs) the combine 103 to move positions (e.g., station-to-station, location-to-location, location-to-station, or station-to-location) on a particular day or group of days during the harvest. As described in greater detail below, the multi-stage prescriptive routing model engine 106 utilizes the input data and the at least one harvest characteristic to generate the combine routing program 126. The combine routing program 126 may prescribe movement of combines 103 at region level (e.g., all the locations within a region) and/or at a global level (all the regions worldwide and their locations).

In general, the multi-stage prescriptive routing model engine 106 includes multiple stages. The stages are arranged in a hierarchical order which the outputs from one stage being fed into the next stage. In particular, each stage of the multi-stage prescriptive routing model engine 106 is generally formulated as a mixed-integer optimization problem or series of problems with the optimal solution from one stage being fed into the next, subsequent stage. Due to the enormous complexity of the generating a combine routing program 126 based on the parameters described herein (e.g., number of combines, harvest characteristics, business deadlines, weather conditions, etc.), the multiple stages of the multi-stage prescriptive routing model engine 106 divides the problem of generating the combine routing program 126 into manageable pieces—the optimal solution for each piece being fed into the next piece.

The following is a description of one embodiment of the multi-stage prescriptive routing model engine 106, as illustrated in FIG. 1. In this description, the multi-stage prescriptive routing model engine 106 is described as determining a combine routing program 126 at a global level for a large agricultural operation. As a result, the following description takes into account all the regions (and locations and fields therein) and all the available combines 103 of the large agricultural operation and prescribes a combine routing program 126 for each region of the large agricultural operation and each combine at the disposal of the large agricultural operation. It is understood the teachings set forth herein may be applied to a combine routing program 126 for a single region and/or a subset of regions (less than all the regions).

Still referring to FIG. 1, the illustrated multi-stage prescriptive routing model engine 106 comprised two stages: a first or demand stage 122 and a second or a scheduling stage 124. In general, the demand stage 122 is configured to identify combine harvesting demand as a function of the input data and the at least one harvest characteristic. In other words, the demand stage 122 is configured to determine the optimal combine quantity assignment at each region based on the harvest needs (e.g., determine on which days what quantity of combines will be assigned to each region), independent of any constraints on resources, such as the actual number of combines available for harvesting. Broadly, the demand stage 122 is configured to determine resource demand (e.g., combine harvesting demand) representing the optimal resource assignment as a function existing and selected attributes and/or conditions. The harvesting demand, produced by the demand stage 122, includes information about the optimum number of combines (the subset number of combines from the total number of combines) that should be assigned to each region (across all the regions) on each day of the harvest in order to maximize the number of crops across all regions that are harvested with the at least one harvest characteristic on that day. In addition, the harvesting demand includes information about a capacity (e.g., number) of combines needed at each location for each harvesting day in order to harvest all the crops at that location while the crops are expected to have the at least one harvest characteristic. The harvesting demand is, broadly, the output (e.g., optimal solution) of the demand stage 122 fed into the scheduling stage 124.

As mentioned above, the demand stage 122 is a mixed-integer optimization problem. One example of a mixed-integer optimization problem for the demand stage 122 is provided below. It is understood alterations or modifications to the following optimization problem and other optimization problems are within the scope of the present disclosure.

In this embodiment, the demand stage 122 mixed-integer optimization problem includes the following parameters, summarized in Table 1 (below). As is apparent, the attributes for some, if not all, of these parameters are provided by the input data and/or the at least one harvest characteristic.

TABLE 1

| Parameter | Description |
| --- | --- |
| Set I | Set of valid locations (e.g., locations having harvest needs) |
| Set J | Set of valid stations |
| Set R | Set of quality rating for each valid location |
| Set Ad | Set of harvest completion dates for each valid location |
| Set Q | Set of combine quantities of type. $Q = \{q_1, q_2, \ldots q_k\}$, where k is the number of combines types |
| Set C | Set of all combines. $C = \{C_1, C_2, \ldots C_k\}$, where $C_1$ is the set of combine type 1, and so on |
| Set Ac | Set of available dates for each combine. $Ac = \{Ac_1, Ac_2, \ldots Ac_k\}$, where $Ac_1$ is the set of available dates for combine type 1, and so on |
| Set Cs | Set of combine capacity at each station. $Cs = \{Cs_1, Cs_2, \ldots Cs_{|J|}\}$, where $|J|$ is the total number of valid stations in Set J |
| Set Ca | Set of operational combines |
| Nc | Number of combine types in total, which is k |
| Set Nh | Set of harvest time windows (e.g., period in which to harvest the crops) starting from horizonStart and ending with horizonEnd in days. In other words, this is the harvest time windows in which the crops are expected to have the harvest characteristic. For example, this is the harvest time window in which the crops can be harvested with the desired moisture content. |

TABLE 1-continued

| Parameter | Description |
| --- | --- |
| Set P | Set of number of fields for each location |
| Set Pc | Number of fields each type of combine could harvest per day |
| Set Itype | Set of unique field types of the fields in each location |
| horizonStart | The earliest possible date for combine movement or harvest (e.g., the minimal value of earliest start date of all stations based on the harvest characteristic) |
| horizonEnd | The latest possible date for combine movement or harvest (e.g., the maximum value of latest harvest dates of all stations based on the harvest characteristic) |
| Set holidays | Set of holiday within the harvest time windows which disrupt harvesting operations |
| dayMoisturePenaltyPWL | Linear piece-wise function to capture the penalty for harvesting on different harvest dates (e.g., a function that captures the harvest characteristic). |
| Set rainDate | The set of dates with rain event(s) in the harvest time windows for all locations |

Figure 4:
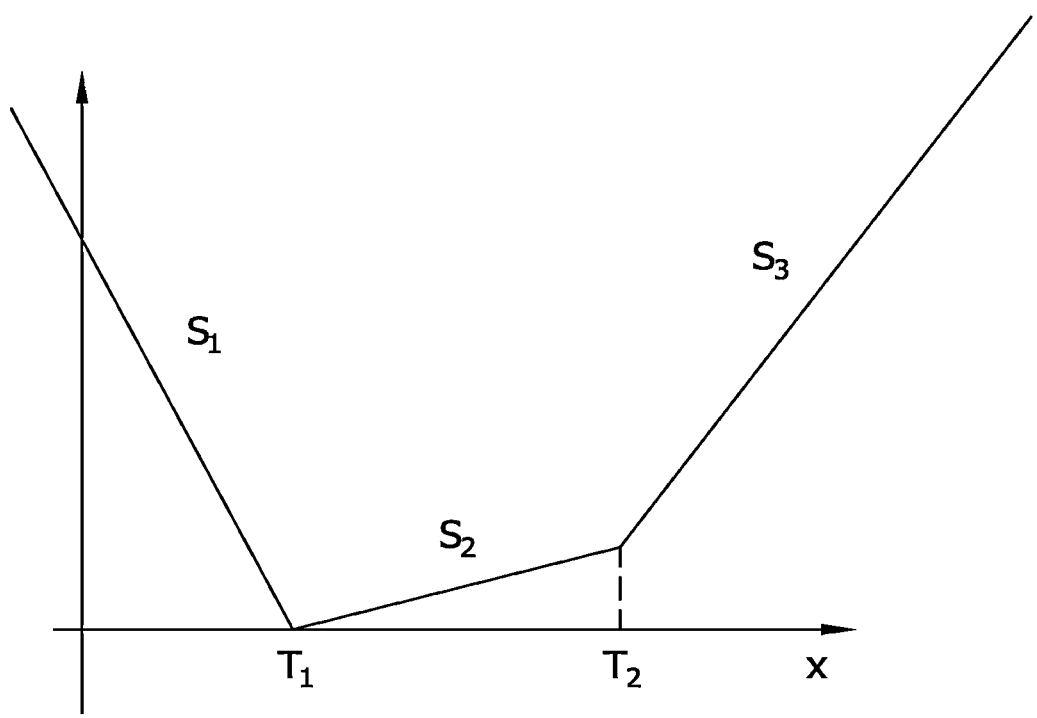
FIG. 4 is an exemplary linear piece-wise function of the combine routing system.

One example of a linear piece-wise function to capture (e.g., quantify) the penalty for harvesting on different harvest dates is shown graphically in FIG. 4. In this embodiment, the linear piece-wise function captures the moisture penalty for harvesting on different dates. In the illustrated graph, the x-axis is time and the y-axis is the relative penalty value, where T1 is the harvest ready date, T2 the moisture dry down date and S1, S2 and S3 are the parameters used in the linear piece=wise function, represented by the slopes of the corresponding linear lines. T1 to T2 represents the harvest time window and S2 represents the relative penalty assigned for harvesting the crops within the harvest time window. As shown in FIG. 4, there is no penalty for harvesting the crops at T1 (e.g., the date the crops are expected to have the harvest characteristic) and there is only a slight increase in the penalty as the crops are harvested closer to T2 (e.g., the latest date the crops are expected to have the harvest characteristic). S1 represents the relative penalty assigned for harvesting crops before T1 and S3 represents the relative penalty assigned for harvesting crops after T2. As illustrated, the relative penalty value for harvesting crops increases sharply the further away from the harvest time window (e.g., before or after) the crops are harvested. The linear piece-wise function and relative parameters S1, S2, S3 may be established by any suitable method, such as those described below with regards to the coefficients.

In this embodiment, the demand stage 122 mixed-integer optimization problem includes the following decision variables, summarized in Table 2 (below).

TABLE 2

| Variable | Description |
| --- | --- |
| $loc_{ikh}$ | Number of type k combines in location i in harvest time h, $loc_{ikh} = 0, 1, 2, \ldots, Q[k]$ |
| $inflow_{jkh}$ | Number of type k combines entering station j at time h, where $inflow_{jkh} = 0, 1, 2, \ldots, Q[k]$ |
| $outflow_{jkh}$ | Number of type k combines leaving station j at time h, where $outflow_{jkh} = 0, 1, 2, \ldots, Q[k]$ |
| $nLoc_{jkh}$ | Number of type k combine in station j at time h. $nLoc_{jkh} = \Sigma_{i \in station j} loc_{ikh}$ |
| moisturePenalty | Penalty for failing to harvest within the harvest time window. moisturePenalty = $\Sigma_{i \in P} \Sigma_{k \in 1 \ldots Nc} \Sigma_{h \in Nh} (6 - R[i]) \times loc_{ikh} \times$ dayMoisturePenaltyPWL(h), where the moisturePenalty is then multiplied by $\eta_1$, the penalty coefficient for moisture penalty |
| adv_date_penalty | Penalty for not being able to complete harvesting before the harvest completion date. adv_date_penalty = $\eta_2 \times \Sigma_{i \in landAd[i]>0} \Sigma_{k \in 1 \ldots Nc} \Sigma_{h>Ad[i]} (loc_{ikh} \times \max(h - Ad[i], 0)$, where the adv_date_penalty is then multiplied by $\eta_2$, the penalty coefficient for the penalty of missing harvest completion date. |
| hub_load_penalty | Penalty for operating combines in stations. hub_load_penalty = $\Sigma_{i \in P} \Sigma_{k \in 1 \ldots Nc} \Sigma_{h \in Nh} loc_{ikh}$ |
| $fraction_{jkh}$ | capacity (e.g., number) of compliance type k combines needed at station j at time h |

Generally, the decision variables in Table 2 quantify or are used to quantify the penalty or loss associated with different aspects of the harvesting operation. For example, moisturePenalty quantifies (e.g., assigns a value) the penalty for failing to harvest the crops within the harvest time window (e.g., quantifying the penalty for failing to harvest the crops when they are expected to have the at least one harvest characteristic). Similarly, hub_load_penalty quantifies the penalty for keeping the combines 103 at the station and not at a location where the combines could be harvesting crops. Similarly, adv_date_penalty quantifies the penalty for failing to harvest the crops before the harvest completion date. Moreover, during harvesting operations, any crops not harvested by the harvest completion date are recorded (e.g., stored) for later use by the multi-stage prescriptive routing model engine 106 (e.g., any violation of the time window is captured) and the fields and/or locations containing the unharvested crops which missed the time window are deprioritized. The coefficients used herein (e.g., penalty coefficients) are used to weight the parameters (e.g., weight the importance of each parameter relative to the other parameters) and are established by any suitable method such as manual setting by a user, optimization methods (local search, random search, grid search, basin-hopping, Bayesian optimization, etc.), monte carlo simulations, feedback from prior instantiations/implementations of the progeny selection process.

The objective function of this mixed-integer optimization problem for the demand stage 122 is to minimize the total penalty, which is determined by using the following equation:

$$\text{total penalty} = \eta_1 \times \text{moisturePenalty} + \eta_2 \times \text{adv\_date\_penalty} + \text{hub\_load\_penalty}$$

In this embodiment, the decision variables and of this demand stage 122 mixed-integer optimization problem are subject to the following constraints, summarized in Table 3 (below).

Running this demand stage 122 mixed-integer optimization problem, described above, results in the generation of an optimal solution to the problem. The optimal solution is obtained when the total penalty, which is subject to the decision variables and the constraints, is minimized. The optimal solution is the combine harvesting demand and, generally, represents the assignment of combines to each region on each harvesting day in order to minimize the total penalty across all the regions. In general, optimization problems are run with the decision variables, constraints, and objective functions set to search for the optimal solution which either maximizes or minimizes an objection. In this case, the optimal solution is the particular assignment of combines 103 to each region on each harvesting day that satisfies all the constraints and results in the lowest total penalty. In addition to the information described above, the combine harvesting demand may also include information about one or more of the latest harvest start date (e.g., the later date among all the earliest possible dates for combine movement or harvest and the current date), earliest moisture dry down date (e.g., the earliest date among all the moisture dry down dates), a list of valid stations (e.g., the subset of stations where stations are not completed yet—stations are no longer valid (e.g., have harvesting needs) once all the fields corresponding to the station are harvested), a list of the locations in the valid stations, and/or a summary of the combines 103 assigned to each region (which may include the combine compliance types and the number of combines). Additional/other types of information can be included in the combine harvesting demand.

After the harvesting demand is determined by the demand stage 122, the multi-stage prescriptive routing model engine 106 proceeds to the scheduling stage 124. In general, the scheduling stage 124 is configured to generate the combine

TABLE 3

| Constraint Number | Description |
| --- | --- |
| 1 | At any time, the number of combines at all stations should be no more than the total number of combines of each type |
| 2 | Combines that are either at a location or on travel should be no more than the total number of combines of each type |
| 3 | At any time, the number of combines at any station should be no more than the maximum number of combines that station can hold |
| 4 | The number of any type combines at any station at the start of the harvest time window is equal to the combines with the same type combines that arrive at this station at the start of the harvest time window |
| 5 | Flow balance at each station holds for any station, combine types, and any date |
| 6 | Outflow of combines at each station should be no more than the actual number of combines at the station |
| 7 | Combines must stay long enough to complete harvesting of all fields within the harvest time window |
| 8 | Combines should not stay for extra days if all fields can be harvested by then |
| 9 | Forbid any combines from showing up at non-matching locations (e.g., combines of certain compliance types and only be used at certain locations) |
| 10 | No combines assigned to locations on rainy days (e.g., combines cannot harvest while it is raining) |
| 11 | No combines assigned to locations on holidays (e.g., combines are not operated on holidays) |
| 12 | No combines assigned to locations on Sundays (e.g., combines are not operated on Sundays) | routing program 126 as a function of the combine harvesting demand. In other words, the scheduling stage 124 is configured to determine the inter-region combine movements for each region (e.g., determine the actual moving routs for each combine to achieve optimal harvest operations). In particular, the scheduling stage 124 is configured to generate a combine routing program 126 that maximizes the amount of crops harvested by the plurality of combines 103 at the plurality of locations that have the at least one harvest characteristic. Broadly, the scheduling stage 124 is configured to generate a resource program (e.g., combine routing program) representing the actual or real-world assignment of resources as a function of the resource demand that minimizes or maximizes one or more attributes. In order to generate the combine routing program 126, the scheduling stage 124 may also access some of the input data and/or the at least one harvest characteristic (e.g., the combine routing program is a function of the combine harvesting demand, input data and/or the at least one harvest characteristic). The combine routing program 126 includes information about one or more of the movement of each combine between stations (and therefore regions), the movement of each combine between the locations in each region, and/or the movement of each combine between the locations and the station in each region (e.g., as explained above, typically each region only includes one station). The combine routing program 126 is, broadly, the output (e.g., optimal solution) of the scheduling stage 124. As mentioned above, the scheduling stage 124 is a mixed-integer optimization problem. One example of a mixed-integer optimization problem for the scheduling stage 124 is provided below. It is understood alterations or modifications to the following optimization problem and other optimization problems are within the scope of the present disclosure.

In this embodiment, the schedule stage 124 mixed-integer optimization problem includes the following parameters, summarized in Table 4 (below). As is apparent, the attributes for some, if not all, of these parameters are provided by the combine harvesting demand, the input data and/or the at least one harvest characteristic.

TABLE 4

| Parameter | Description |
| --- | --- |
| Set J | Set of valid stations |
| Nc | Number of combine compliance types in total, such a four (e.g., Type-A, Type-B, Type-C, Type-D) |
| Set Nh | Set of harvest time windows |
| Set A | Set of active (e.g., operational or functional) combines (note: in transit combines are non-active combines) |
| Set C | Set of type for each combine; Set C = {type-A, type-B, type-C, . . . } |
| Set S | Set of current station for each combine |
| Set Ac | Set of available dates for each combine |
| horizonStart | The latest harvest start date |
| Matrix drivingDistance | drivingDistance$_{j_1,j_2}$ is the driving distance from station $j_1$ to station $j_2$ |
| Matrix moveDuration | moveDuration$_{j_1,j_2}$ is the time it takes to move from station $j_1$ to station $j_2$ |
| minType$_{jkh}$ | The minimum number of combines needed at each station in each harvest time window, here $j \in J$, $k \in 1 \ldots Nc$, $h \in Nh$ |

In this embodiment, the scheduling stage 124 mixed-integer optimization problem includes the following decision variables, summarized in Table 5 (below). The scheduling stage 124 may use some of the same variable labels as the demand stage 122, but they may represent different meanings.

TABLE 5

| Variable | Description |
| --- | --- |
| locjkh | Binary variable, loc$_{jkh}$ = 1 if a type k combine is assigned to station j in harvest time window h, 0 otherwise |
| penNumType$_{jkh}$ | The difference between combine quantity for compliance type k needed at location j at time h versus combine quantity delivered |
| move$_{j_1,j_2,a,h}$ | The moves of each combine from station $j_1$ to station $j_2$ in the harvest time window h, where $j_1 \in J$, $j_2 \in J$, $a \in A$, $h \in Nh$ |
| redun$_{jk}$ | The unfulfilled combine needs at a station for type k combine |
| totaldrivingDistance | The total driving distance of all combines. totaldrivingDistance = $\Sigma_{j_1 \in J}\Sigma_{j_2 \in J}\Sigma_{k \in 1\ldots Nc}\Sigma_{h \in Nh}$drivingDistance$_{j_1,j_2}$ × move$_{j_1,j_2,k,h}$ |
| movesOvera | Penalty for moving too many times. movesOvera = max (0, −maxMoves$_a$ + $\Sigma_{m \in moves}$move$_m$) |
| rPenalty | The penalty for failing to match the combines needed to the combines delivered. rPenalty = $\Sigma_{j \in J}\Sigma_{k \in 1\ldots Nc}\Sigma_{h \in Nh}$penNumType$_{jkh}$ |
| redunpen | Penalty for not meeting the needs at a station. redunpen = $\Sigma_{j \in J}\Sigma_{k \in 1\ldots Nc}$redun$_{jk}$ |

Generally, the decision variables in Table 5 quantify or are used to quantify the penalty or loss associated with different aspects of the harvesting operation. For example, rPenalty quantifies (e.g., assigns a value) the penalty for failing to match the number of combines needed at each location with the number of combines assigned to that location (e.g., quantifying the penalty for not being able to harvest all the crops at a location). Similarly, redunpen quantifies the penalty for failing to match the number of combines needed at a station (and therefore a region) with the number of combines assigned to that station. As mentioned above, agricultural operations generally to do not have enough combines 103 to cover every location. Accordingly, there is expected to be some penalties for failing to match combines needed to the combines assigned.

The objective function of this mixed-integer optimization problem for the scheduling stage 124 is to minimize the total penalty, which is determined by using the following equation:

$$\text{total penalty} = \eta_3 \times rPenalty + \eta_4 \times redunPen + \eta_5 \times totaldrivingDistance + \eta_6 \times \sum_{a \in A} movesover_a$$

In this equation, $\eta_3$, $\eta_4$, $\eta_5$, and $\eta_6$ are coefficient parameters for the different decision variables. The different coefficient parameters are weighted according to the factor's (e.g., decision variable) importance. For example, if minimizing the penalty for failing to deliver the number of combines needed is more important than the total driving distance, will have a large value than $\eta_5$, resulting in rPenalty being given more weight than totaldrivingDistance. The coefficient parameters are constant and are set by an operator before the scheduling stage 124 is executed. The exact values of these coefficient parameters depends on the relative importance of each factor to the operator.

In this embodiment, the decision variables and of this scheduling stage 124 mixed-integer optimization problem are subject to the following constraints, summarized in Table 6 (below).

TABLE 6

| Constraint Number | Description |
| --- | --- |
| 1 | One combine can only be present at one station at any time of the harvest time window (e.g., making sure there is consistent flow of combines through the network) |
| 2 | Moving rule after harvest starts, which includes the following cases: Case 1: if a combine is not at station j at time h-1, and will not arrive at station j at time h, then this combine will not stay or move out form the station j at time h (e.g., if the combine is not at the station yesterday or today, the combine cannot stay or move out today) Case 2: if a combine is not at station j at time h-1, but will arrive at station j at time h, then the combine will be at station j at time h, but cannot be moved out on time h (e.g., if the combine is not at the station yesterday but arrives today, the combine can stay at the station but not move out) Case 3: if a combine is at station j at time h-1, then it will either stay at station j at time h or move out at time h (e.g., if the combine is at the station yesterday, the combine will either stay at the station or move out today) |
| 3 | For one combine there can be at most one move in seven days. It is generally not efficient to make frequent moves from an operational perspective. |
| 4 | Determining the quantity of unfulfilled combine needs at a station for type k combine. The penalty of unfulfilled combine needs on each day will be the minimum combines needs minus the realization of the decision variable of actual number of combines assigned: if the number of combines assigned is less than the minimal needs, the penalty will be positive, otherwise, the penalty will be negative. |
| 5 | Determining the total quantify of unfulfilled combine needs across all locations and the entire harvest time window. Similar to constraint four, the difference is the penNumType capture the penalty for each day. This constraint captures the penalty for the total time window, which means one's unfulfilled combine needs may be compensated by other days. |
| 6 | Capturing the combine locations before the harvest time window starts. This is to set the starting point for each combine. If the combine is at some station at the beginning of the time window, this constraint is one. |
| 7 | At the beginning of the harvest time window, the combines at station j at time h-1 will either move out on that day or stay |

In addition, the mixed integer optimization problem of the scheduling stage 124 assumes that the combine 103 or combines assigned to a location will stay at their assign location until all the fields at that location have been harvested. In other words, the scheduling stage does not move combines from a location until the combines have harvested all the crops at that location. Moreover, it is assumed that while a combine 103 is at a location, the combine is harvesting the crops in the fields at that location unless the combine is not operational or it is raining.

Running this scheduling stage 124 mixed-integer optimization problem, described above, results in the generation of an optimal solution to the problem. The optimal solution is obtained when the total penalty, which is subject to the decision variables and the constraints, is minimized. The optimal solution is the combine routing program 126 and, generally, represents the prescribed movement of each combine. Specifically, the combine routing program 126 prescribes the movement of each combine that maximizes the amount of crops harvested by the combines 103 that have the at least one harvest characteristic. In other words, the combine routing program 126 is the prescribed movement of each combine that results in the minimum total penalty. The prescribed movement for the combines 103 can be for a region, a group of regions or for all the regions (e.g., word wide).

Generally, the combine routing program 126 prescribes the movement of each combine 103 of the plurality of combines between the plurality of locations to harvest the crops in the fields at each location. For example, the combine routing program 126 may include an origination position, a destination position and a moving date for each combine. In particular, the combine routing program 126 may include information about one or more of a combine movement itinerary, a daily summary for each combine and/or a location summary for each location. The combine movement itinerary may include one or more of the name of each combine, the origination (e.g., current) position (e.g., station, location) for each combine, the destination position (e.g., station, location) for each combine, the distance between the origination and destination positions, the moving date for each combine to start moving from the origination position to the destination position and information about if an operator has accepted the move or rejected the move and why. The daily summary for each combine specifies the location for the combine on each day and may include one or more of the name of the combine, the compliance type of the combine, the position (e.g., station, location) of the combine and the date the combine is at that position. The location summary for each location prescribes the recommended movement date for each combine at the location level and may include one or more of the identifier for the location, the name of the station associated with the location, the starting and ending dates of the harvest time window, the harvest completion date, the field quality rating, the compliance type, the recommended combine moving date, the available dates and the number of combines at the location.

The combine routing program 126 can be updated in real time. As mentioned above, the input data and/or at least one harvest characteristic may be updated in real time. In response to either or both of the input data and/or at least one harvest characteristic being updated in real time, the combine routing program 126 may be updated in real time. Specifically, in response to either or both of the input data and/or at least one harvest characteristic being updated, the multi-stage prescriptive routing model engine 106 is executed (e.g., re-executed) to generate an updated combine routing program 126 (e.g., a subsequent, new combine routing program) that take into account the updated data. Alternatively, multi-stage prescriptive routing model engine, the input data and/or at least one harvest characteristic may be updated every two to three days, for example as weather details change and the harvesting of fields is completed.

Referring to FIG. 1, the multi-stage prescriptive routing model engine 106 may include a model input module 128. The model input module 128 is configured to access the one or more data stores 104 containing the input data and the at least one harvest characteristic and the supply the data to the multi-stage prescriptive routing model engine 106. The model input module 128 may also transform or format the input data and the at least one harvest characteristic so that the multi-stage prescriptive routing model engine 106 can, when executed by the processor 105, use the data to generate the combine routing program 126.

The system 100 may also include a post-processing operation 130 that receives or takes the combine routing program 126 generated by the multi-stage prescriptive routing model engine 106 and stores the combine routing schedule in the one or more data stores 104. This can be the same data stores 104 the input data and at least one harvest characteristic are stored on (as well as the computer executable instructions) or a different data store. In one embodiment, the post-processing operation 130 is embodied on a computer-readable memory storage device, such as the one or more data stores 104, and is executed by a processor, such as the routing processor 105.

The system 100 may also include a user interface 108 to allow one or more operators to interact with the system. The system 100 can include one or more user interfaces 108. In one embodiment, each station may include a user interface 108. Each user interface 108 may be in wired or wireless communication with the other components of the system 100, as mentioned above. Each user interface 108 preferable includes a display (e.g., graphic display) configured to display the combine routing program, or at least a portion thereof, to the operator (e.g., user). Preferably, each user interface 108 can also receive input form the operator. For example, the user interface 108 may, in response to input by the operator, show the combine routing program for a specific combine, or show the combine routing program at a station or location level. In another example, at least a portion of the input data and/or the at least one harvest characteristic is inputted into the system 100 by an operator using the user interface 108. In one embodiment, instead of or in addition to updating the input data, the at least one harvest characteristic and/or the combine routing program 126 in real time, the system 100 may update the input data, the at least one harvest characteristic and/or the combine routing program upon receiving input from an operator via the user interface 108.

Figure 3:
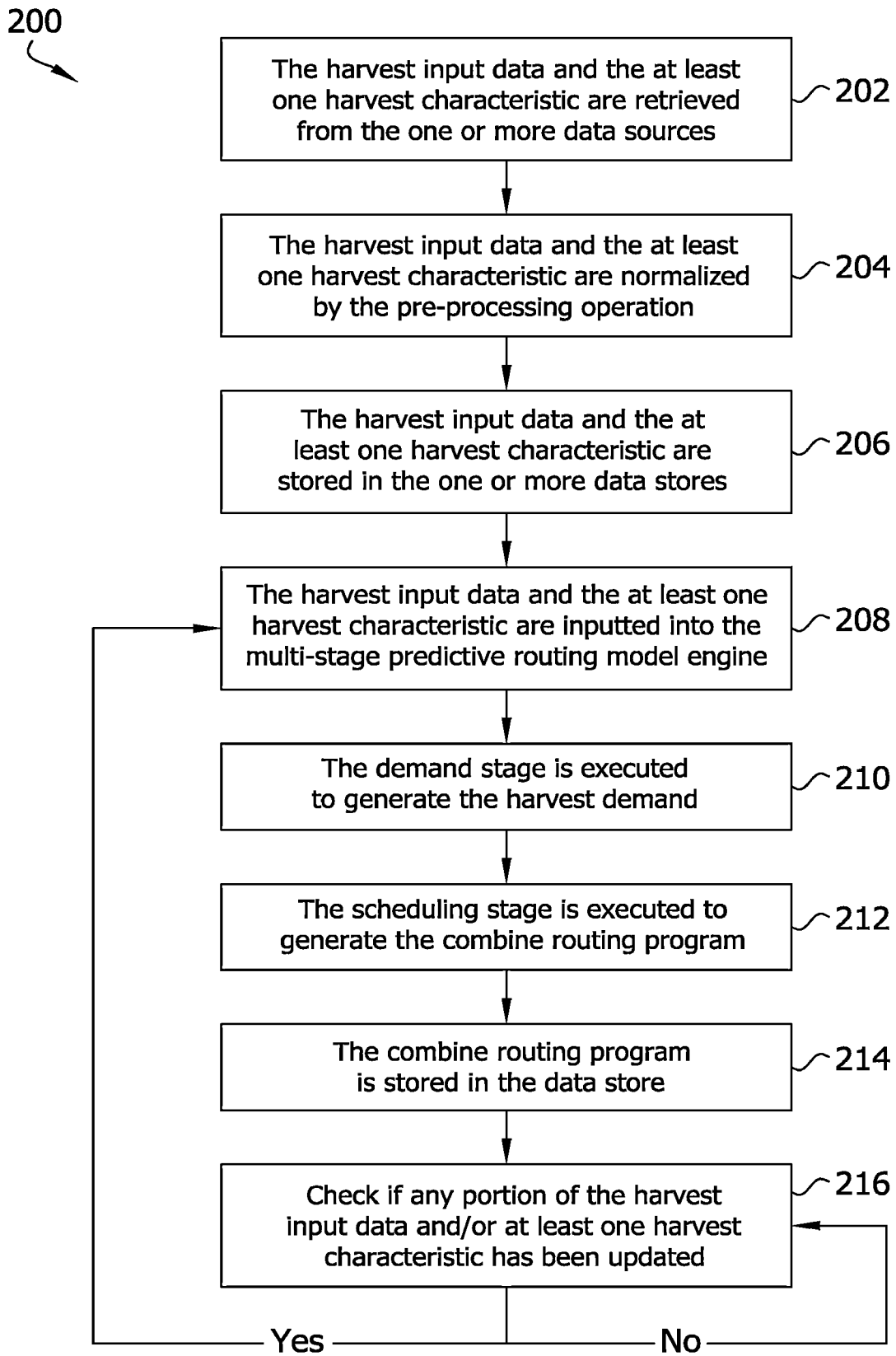
FIG. 3 is an exemplary flow diagram illustrating a method for determining a combine routing program according to one embodiment of the present disclosure.

FIG. 3 illustrates an exemplary method 200 for generating the combine routing program 126 in accordance with one embodiment of the present invention. In one embodiment, one or more, if not all, of the operations or steps illustrated in FIG. 3 may be executed by routing processor 105 to implement the multi-stage prescriptive routing model engine 106. The method 200 begins at 202, where input data is retrieved or collected from the data sources 102. In particular, the combine inventory data, the location data, the harvest progress data, the weather data and/or the reference data is retrieved from the data sources 102. In this example, the at least one harvest characteristic is also retrieved from the data sources 102 at 202, although it is understood that other ways of retrieving or acquiring the at least one harvest characteristic, as described herein, may be utilized.

At 204, the pre-processing operation 120 normalizes the input data and/or at least one harvest characteristic. At 206, the normalized input data and/or at least one harvest characteristic is stored in the one or more data stores 104. At 208, the input data and the at least one harvest characteristic are inputted into the multi-stage prescriptive routing model engine 106. In one embodiment, the model input module 128 accesses the input data and the at least one harvest characteristic in the one or more data stores 104 and supply to the data to the multi-stage prescriptive routing model engine 106—specifically the stages thereof. At 210, the demand stage 122 of the multi-stage prescriptive routing model engine 106 is executed. The demand stage 122 utilizes the input data and at least one harvest characteristic to generate the harvesting demand. At 212, the scheduling stage 124 of the multi-stage prescriptive routing model engine 106 is executed. The scheduling stage 124 utilizes the harvesting demand generated by the demand stage 122, as well as the input data and/or at least one harvest characteristic, to generate the combine routing program 126. At 214, the combine routing program is stored in the one or more data stores. In one embodiment, this is done by the post-processing operation 130. At this point, the combine routing program can now be accessed by the user interface 108.

The method continues at 216, where, in this embodiment, the combine routing program 126 is updated in real time automatically by the system 100. At 216, a check is made to determine if at least any portion of the input data and/or the at least one harvest characteristic have been updated or contain new information. In this embodiment, it is understood that operations 202, 204, and 206 may be running continuously or at standard intervals (e.g., one hour) in order to update the input data and/or the at least one harvest characteristic. If no portion of the input data and/or the at least one harvest characteristic have been updated, the no path is taken and operation 216 repeats (continuously or at standard intervals) to continue to check if there have been any updates. If a portion of the input data and/or the at least one harvest characteristic have been updated, the yes path is taken to step 208 in order to generate an updated combine routing program 126 with the new data.

Aspects of the system 100 described herein were tested during the harvesting period of a large agricultural operation. In this test, the harvest characteristic was the moisture content of the crop being harvested. Using aspects of the system 100, a combine routing program was developed and implemented that resulted in a 15% increase in the percentage of crops harvested that contained a moisture content within the target range (e.g., predetermined range) over the previous combine routing program which was generated manually. It is believed the 15% increase is a result of the combine routing program 126 being generated by a multi-stage prescriptive routing model engine 106 that is able to account for and incorporate a larger quantity of information (e.g., weather data, harvest characteristics, travel distances, etc.) than possible by manual methods and the ability to update the combine routing model in real time. The parameters (e.g., weather, harvest characteristic, combine operational status) utilized to create the combine routing program 126 change constantly and the multi-stage prescriptive routing model engine 106 is able to continuously update the combine routing program in real time to adjust to these changing parameters. Previous manual methods for generating combine routing programs could not handle this level of complexity. As a result of this increase, the consistency of the harvested crops is improved. For example, in a breeding operation, the harvested crops are typically tested for one or more attributes. The improved consistency of the harvested crops (e.g., harvested seeds) generated by system 100 creates better testing results because a greater percentage of the crops have a moisture content within the desired range.

Moreover, the method for generating the combine routing program 126, described herein, could not be done using manual methods because it would take too long to determine the optimal solution (e.g., the harvesting demand and the combine routing program) to each stage of the multi-stage prescriptive routing model engine 106. As mentioned above, one large agricultural operation could have $3 \times 10^{204}$ possible number of moves for their combines 103. By the time the optimal solution was discovered manually, the parameters (e.g., weather, harvest characteristic, combine operational status) will have changed, resulting in the optimal solution being outdated and useless.

As mentioned above, the routing system 100 is not limited to combines and harvest characteristics, as the routing system described herein can be used to generate a routing program for other devices based on other parameters (e.g., characteristics). One skilled in the art understands that the systems and methods described herein (e.g., the multi-stage predictive routing model engine 106) can be used to route other types of agricultural equipment across a plurality of locations and a plurality of fields in a large agricultural (e.g., farming) operation.

For example, the systems and methods described herein can be used to route a fleet of unmanned aerial vehicles (UAV). In modern agriculture, UAVs can be used to monitor fields or phenotype plants using sensors or imagery. UAVs can also be used to apply chemistry, nutrients, irrigation, biologicals, or other topical treatments to a field. In the same way that the multi-stage predictive routing model engine for combines is determined (in part) by harvest characteristics, UAV routing is determined by crop characteristics such as the appropriate plant growth stage for the application of a topical treatment (to maximize the amount of crops that have the treatment applied at the correct time), or specific environmental growth conditions that stimulate a plant disease response or damage. The routing of UAV is subject to its own unique set of constraints, which may include, but are not limited to: the number of available licensed UAV pilots at a given location, cloudy conditions that may inhibit imaging, inclement weather that may adversely affect flight patterns, regulatory restriction that may prohibit the application of topical treatments, battery power status etc.

In another example, the systems and methods described herein can be used to route in-field devices or vehicles (either manned or unmanned). In-field devices or vehicles (either manned or unmanned) can also be used to monitor fields, phenotype plants using sensors or imagery, or apply chemistry, nutrients, irrigation, biologicals, or other topical treatments to a crop. Therefore, one of skill in the art could use the multi-stage predictive routing model engine to route a fleet of in-field devices or vehicles across a plurality of locations and a plurality of fields in a large farming operation in order to collect in-field data about a crop or deliver a treatment to a crop based on at least one crop characteristic. Non-limiting examples of such in-field activities performed by an in-field vehicle include interacting with the plants to sense information, apply treatments, collect samples, etc. as described in: 1) U.S. patent application Ser. No. 15/502,548, filed Feb. 8, 2017, and titled Apparatus and Methods for In-Field Data Collection and Sampling; and/or 2) U.S. patent application Ser. No. 16/089,796, filed Sep. 28, 2018, and titled Stem Sensor; and/or 3) U.S. patent application Ser. No. 14/353,036, filed Apr. 21, 2014, and titled Plant Stand Counter; and/or 4) U.S. patent application Ser. No. 15/350,169, filed Nov. 14, 2016, and titled Plant Stand Counter. The Applicant/assignee of the above referenced Ser. Nos. 15/502,548, 16/089,796, 14/353,036 and 15/350,169 patent applications is the same Applicant/assignee of the present application, and the above referenced Ser. Nos. 15/502,548, 16/089,796, 14/353,036 and 15/350,169 patent applications are incorporated by reference herein in their entirety such that it is envisioned that in various embodiments one or more or all the components described in one or more of the above referenced Ser. Nos. 15/502,548, 16/089, 796, 14/353,036 and 15/350,169 patent applications can be combined with and/or included in the multi-stage predictive routing model engine described above, and/or vice-versa.

In another example, the systems and methods described herein may be used to route a fleet of planters across a plurality of locations and a plurality of fields in a large farming operation. In this example, the planter routing is limited by its own unique set of constraints, which may include, but are not limited to: availability of the appropriate seed for planting, predicted seedling emergence time, soil-by-seed interactions, soil conditions, seed treatment shelf-life, etc.

Embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can be accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the disclosure may be embodied in computer-executable instructions (i.e., software), routines, or functions stored in system memory or non-volatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a routing processor; and
one or more computer-readable storage media storing harvest input data, at least one harvest characteristic, and computer-executable instructions, the harvest input data relating to the harvesting of crops at a plurality of locations in one or more fields by a plurality of combines, the at least one harvest characteristic including an attribute of the crops;
wherein the computer-executable instructions, when executed by the routing processor, configure the routing processor to:
generate, using a multi-stage prescriptive routing model engine, a combine routing program based on the harvest input data and the at least one harvest characteristic, the combine routing program defining movement of multiple combines of the plurality of combines between the plurality of locations in the one or more fields;
wherein the multi-stage prescriptive routing model engine comprises:
a demand stage configured to:
capture a penalty specific to the attribute of the crops; and
identify combine harvesting demand as a function of the harvest input data, the at least one harvest characteristic, and the captured penalty; and
a scheduling stage configured to generate the combine routing program as a function of (i) the combine harvesting demand and (ii) a penalty for not assigning one(s) of the plurality of combines to one(s) of the plurality of locations; and
cause one or more of the plurality of combines to move consistent with the generated combine routing program to harvest the crops at the one(s) of the plurality of locations.

2. The system of claim 1, wherein the computer-executable instructions, when executed, configure the routing processor to generate, using the multi-stage prescriptive routing model engine, the combine routing program to maximize an amount of crops harvested by the plurality of combines at the plurality of locations that have the at least one harvest characteristic.

3. The system of claim 1, wherein the scheduling stage is configured to generate the combine routing program to maximize an amount of crops harvested by the plurality of combines at the plurality of locations that have the at least one harvest characteristic.

4. The system of claim 1, wherein the attribute of the crops includes a moisture content of each crop on a date of harvesting the crop.

5. The system of claim 1, wherein the combine harvesting demand includes a capacity of combines needed at each location of the plurality of locations for each harvesting day.

6. The system of claim 1, wherein the combine routing program includes an origination position, a destination position, and a moving date for each combine.

7. The system of claim 1, wherein the harvest input data includes at least one of combine inventory data representing the plurality of combines, location data representing at least one attribute of each location of the plurality of locations, harvest progress data representing at least one attribute of any harvesting completed by the plurality of combines, and weather data representing at least one of a current and an expected weather conditions at each location of the plurality of locations.

8. The system of claim 7, wherein the harvest input data further includes combine inventory data, location data, harvest progress data, and the weather data.

9. The system of claim 8, wherein the routing processor is configured to retrieve the combine inventory data, location data, harvest progress data, and weather data from two or more sources; and
wherein the computer-executable instructions, when executed, configure the routing processor to normalize the combine inventory data, location data, harvest progress data, and weather data before the combine inventory data, location data, harvest progress data, and weather data are stored in the one or more computer-readable storage media.

10. The system of claim 1, wherein at least a portion of the harvest input data is updated in real time; and
wherein the computer-executable instructions, when executed, configure the routing processor to update, using the multi-stage prescriptive routing model engine, the combine routing program in real time in response to the harvest input data being updated.

11. The system of claim 10, wherein the harvest input data includes real time harvest progress data representing harvesting completed by the plurality of combines.

12. The system of claim 1, further comprising a user interface including a display, the display configured to display the combine routing program to a user.

13. A computer-implemented method comprising:
storing, in one or more computer-readable storage media, harvest input data relating to harvesting of crops at a plurality of locations by a plurality of combines, each location including one or more fields containing crops for harvest by at least one of the plurality of combines;
storing, in the one or more computer readable storage media, at least one harvest characteristic, the at least one harvest characteristic including an attribute of the crops to be harvested by the plurality of combines;
executing, by a routing processor, a multi-stage prescriptive routing model engine based on the harvest input data and the at least one harvest characteristic, to generate a combine routing program defining movement of each combine of the plurality of combines between the plurality of locations, the multi-stage prescriptive routing model engine including a demand stage and a scheduling stage;
wherein executing the multi-stage prescriptive routing model engine includes:
executing the demand stage to identify a combine harvesting demand; and
executing the scheduling stage to generate the combine routing program as a function of (i) the combine harvesting demand and (ii) a penalty for not assigning one(s) of the plurality of combines to one(s) of the plurality of locations; and
causing, based on the generated combine routing program, movement of one or more of the plurality of combines to harvest the crops at the one(s) of the plurality of locations.

14. The method of claim 13, wherein the attribute of the crops is a moisture content of each crop on a date of harvesting the crop.

15. The method of claim 13, wherein the combine harvesting demand includes a number of combines needed at each location of the plurality of locations for each harvesting day.

16. The method of claim 13, wherein the combine routing schedule includes an origination position, a destination position, and a moving date for each combine.

17. The method of claim 13, further comprising:
updating at least a portion of the harvest input data in real time; and
updating the combine routing program in real time by re-executing the multi-stage prescriptive routing model engine to generate an updated combine routing program.

18. A system comprising:
a plurality of combines for use in an agricultural operation;
a routing processor; and
one or more computer-readable storage media coupled in communication with the routing processor and storing harvest input data, at least one harvest characteristic and computer-executable instructions, the harvest input data relating to the harvesting of crops within the agricultural operation at a plurality of locations in multiple fields by the plurality of combines, the at least one harvest characteristic including an attribute of the crops to be harvested by the plurality of combines;
wherein the computer-executable instructions, when executed by the routing processor, configure the routing processor to:
identify, using a demand stage of a multi-stage prescriptive routing model engine, a combine harvesting demand based on the harvest input data and the at least one harvest characteristic, and a penalty specific to the attribute of the crops;
generate, using a scheduling stage of the multi-stage prescriptive routing model engine, a combine routing program as a function of (i) the combine harvesting demand and (ii) a penalty for not assigning one(s) of the plurality of combines to one(s) of the plurality of locations, wherein the combine routing program defines movement of each combine of the plurality of combines within the agricultural operation; and instruct, based on the generated combine routing program, movement of one or more of the plurality of combines to harvest the crops at the one(s) of the plurality of locations.

19. The system of claim 18, wherein the harvest input data includes real time harvest progress data representing harvesting completed by the plurality of combines.

\* \* \* \* \*